United States Patent
Tse

(10) Patent No.: US 7,418,610 B2
(45) Date of Patent: Aug. 26, 2008

(54) OPTICAL DISK DRIVE WITH POWER SAVE MODE

(75) Inventor: Hong Wing Tse, Tsuen Wan (HK)

(73) Assignee: Thomson Licensing, Boulogne-Billancourt (FR)

( * ) Notice: Subject to any disclaimer, the term of this patent is extended or adjusted under 35 U.S.C. 154(b) by 163 days.

(21) Appl. No.: 10/584,657

(22) PCT Filed: Nov. 6, 2004

(86) PCT No.: PCT/EP2004/012594

§ 371 (c)(1),
(2), (4) Date: Jun. 26, 2006

(87) PCT Pub. No.: WO2005/069290

PCT Pub. Date: Jul. 28, 2005

(65) Prior Publication Data

US 2007/0195660 A1    Aug. 23, 2007

(30) Foreign Application Priority Data

Jan. 5, 2004    (EP) .................................. 04290021

(51) Int. Cl.
*G06F 1/00* (2006.01)
(52) U.S. Cl. ...................... 713/322; 713/300; 713/320; 369/53
(58) Field of Classification Search ................ 713/322, 713/300, 320
See application file for complete search history.

(56) References Cited

U.S. PATENT DOCUMENTS

| 5,345,347 | A | * | 9/1994 | Hopkins et al. ............... 360/71 |
| 5,473,589 | A | * | 12/1995 | Horie ....................... 369/53.37 |
| 5,715,218 | A | * | 2/1998 | Ikeda ....................... 369/44.29 |
| 5,799,197 | A | | 8/1998 | Juso et al. |
| 5,822,288 | A | * | 10/1998 | Shinada ................... 369/47.33 |
| 6,310,848 | B1 | * | 10/2001 | Ueki ....................... 369/53.37 |
| 2004/0071064 | A1 | * | 4/2004 | Kim et al. ................ 369/53.18 |

OTHER PUBLICATIONS

Search Report Dated Apr. 4, 2005.

* cited by examiner

*Primary Examiner*—Thomas Lee
*Assistant Examiner*—Vincent T Tran
(74) *Attorney, Agent, or Firm*—Joseph J. Laks; Robert B. Levy; Jorge Tony Villabon

(57) ABSTRACT

The present invention relates to a portable optical disk drive having a power save mode for reducing the energy consumption. It is an object of the invention to propose an improved solution for a power save mode. This object is achieved by a method for driving an optical disk drive in a power save mode having the steps of:
    receiving an indication to start power save mode
    turning off a servo driver of the optical disk drive
    after that, turning off a photodetector of the optical disk drive
    awaiting an indication to stop power save mode
    turning on said photodetector
    after that, turning on said servo driver.

8 Claims, 1 Drawing Sheet

OPTICAL DISK DRIVE WITH POWER SAVE MODE

Figure 1:
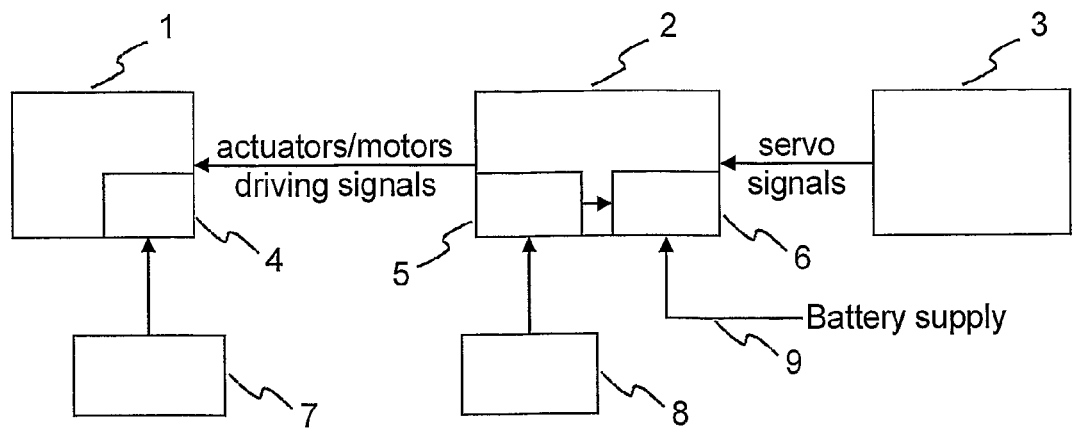

This application claims the benefit, under 35 U.S.C. § 365 of International Application PCT/EP04/012594, filed Nov. 6, 2004, which was published in accordance with PCT Article 21(2) on Jul. 28, 2005 in English and which claims the benefit of European patent application No. 04290021.7, filed Jan. 5, 2004.

The present invention relates to an optical disk drive, as e.g. a portable optical disk drive, having a power save mode for reducing the energy consumption.

Especially for portable optical disk drives it is desirable to reduce the power consumption. Current products are operated in 2× speed mode using a buffer memory. When the buffer memory is full the spindle motor of the disk drive is turned off. When the buffer memory filling level falls below a defined threshold the spindle motor is then turned on again. However, the pickup of the disk drive is still powered, i.e. an internal photodetector IC (PDIC) and all servos are still energized. This wastes up to 30 mW, i.e. some hours of playing time. The current practice is to just "mute" all servos or to just keep the spindle servo in place and switch off the laser in case the buffer is full. Still, the energy saving is not yet optimized.

In this context U.S. Pat. No. 6,747,933 discloses a power saving system for an optical disk recording or reproducing apparatus. When a buffer memory filling level exceeds a predetermined level, the system goes into a power save mode. Before the buffer memory becomes empty, normal operation is resumed. In the power save mode the power supply to a variety of components is cut.

However, simply cutting off the power supply to the servos directly through the power supply to the servo driver IC is not recommended as it incurs higher manufacturing cost and a constant power loss even in normal operation. Further, there are timing problems regarding the coordination as to when the power supply is to be re-established and when the servo control is to be resumed.

It is, therefore, an object of the invention to propose an improved solution for a power save mode which overcomes the above disadvantages of the prior art.

According to the invention, this object is achieved by a method for driving an optical disk drive in a power save mode having the steps of:
receiving an indication to start power save mode,
turning off a servo driver of the optical disk drive,
after that turning off a photodetector of the optical disk drive,
awaiting an indication to stop power save mode
turning on said photodetector, and
after that turning on said servo driver.

The invention proposes not to cut off the power supply of the servo actuators and the motors directly, but to disable the driving signal from the servo driver indirectly through a gate signal to a servo controller of the servo driver IC, and to subsequently disable the power supply to the internal PDIC of the pickup. This leads to nearly no supply of power to the servo actuators, motors and the internal PDIC of the pickup with a proper timing control as well as no additional power loss under normal operation. The turn on sequence of a) turn on power supply to internal PDIC, b) turn on the driving signal, and c) let the servo controller start the rest of the servo sequence, which allows for correct and fast re-establishing of data reading, is thus guaranteed. In this way a reduced power consumption with no or nearly no recognizable negative effect is achieved. According to an alternative embodiment of the invention, the turning off/on of the internal PDIC is performed by turning off/on a light source generating light to be detected by the internal PDIC.

If the power supply to the internal PDIC is cut off directly earlier than the driving signal to the servo driver IC, the servo actuators (or even the motors) could be out of control at that brief moment. This might damage the pickup in case of a frequent occurrence. Thus, the sequence to save power is to first disable the driving signal to the servo driver IC, and only then to cut off the power supply to the internal PDIC of the pickup. To resume normal operation, the sequence is performed in reverse order. The time delay between the two actions, which is around 200 ms or more, depends on the response time of the external circuit which controls the disabling/enabling of the driving signal to the servo driver IC and the disabling/enabling of the power supply to the internal PDIC of the pickup.

Though the invention has been described with reference to an optical disk drive, it is to be understood that the invention is not limited to this type of drive. It is likewise applicable to other drives having a servo driver and a signal detector with individual power supplies.

Figure 2:
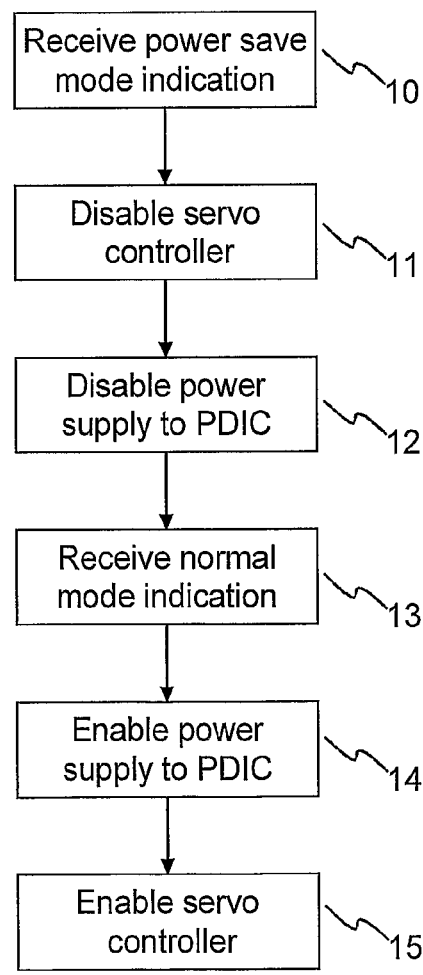

For a better understanding the invention shall now be explained in more detail in the following description with reference to the figures. It is understood that the invention is not limited to this exemplary embodiment and that specified features can also expediently be combined and/or modified without departing from the scope of the present invention. In the figures:

FIG. 1 shows an optical disk drive with a power save mode according to the invention, and FIG. 2 depicts a sequence of switching into a power save mode and returning to normal operation.

FIG. 1 shows an optical disk drive with a power save mode according to the invention, in this case a CD drive. The disk drive includes a CD mechanism 1, i.e. a pickup with actuators for focusing and tracking and an internal photodetector IC 4, a spindle motor, etc., for reading data stored on a CD. The photodetector IC 4 is energized by a power supply 7. The CD mechanism 1 receives actuator and motor driving signals from a servo driver IC 2 based on servo signals from a CD servo digital signal processor 3. The servo driver IC 2 includes a power supply 6 for driving the actuators and motors of the CD mechanism 1. This power supply 6 receives its energy from a battery supply through a path 9 and is controlled by a controller 5, which is also included in the servo driver IC 2 and enables and disables the supply of power to the power supply 6. The controller 5 receives an appropriate gate signal (on/off) from a gate 8.

According to the prior art, the power save mode is achieved by cutting off the supply of power to the power supply 6 via the path 9. This, however, results in a higher component cost (or BOM—Bill Of Materials cost) than the cost of the power supply 7 and the gate 8 together. Besides, there would be a constant loss of power through the path 9, whereas the loss of power through the power supply 7 and the gate 8 is comparatively small. By implementing a proper timing sequence for switching the power supply 7 and the gate 8 a power saving of around 30 mW or more once memory buffer is full is achieved. This corresponds to roughly 8% to 10% saving depending on the system design and the components that are being used.

A sequence of switching into a power save mode and returning to normal operation is depicted as a flowchart in FIG. 2. After receiving 10 an indication to start the power save mode, first the servo driver 2 of the optical disk drive is turned off by disabling 11 the driving signal from the servo driver 2 indirectly through a gate signal to the servo controller 5. After that the photodetector 4 of the optical disk drive is turned off by disabling 12 its power supply. In order to return to the normal mode operation, after receiving 13 an indication to stop the power save mode and return to the normal mode first the photodetector 4 is turned on by enabling 14 its power supply. Subsequently the servo driver 2 is turned on again by indirectly enabling 15 the driving signal from the servo driver 2 through the gate signal to the servo controller 5.

The invention claimed is:

1. Method for driving an optical disk drive in a power save mode having the steps of:
   receiving an indication to start power save mode;
   turning off a servo driver of the optical disk drive by disabling driving signals from the servo driver by disabling a supply of power to the servo driver with a controller included in the servo driver
   after that, turning off a photodetector of the optical disk drive;
   awaiting an indication to stop power save mode;
   turning on said photodetector; and
   after that, turning on said servo driver.

2. Method according to claim 1, wherein disabling the driving signals from the servo driver is performed through a gate signal to the servo driver.

3. Method according to claim 1, wherein the steps of turning off/on the photodetector are performed by turning off/on the power supply of the photodetector.

4. Method according to claim 1, wherein the steps of turning off/on the photodetector are performed by turning off/on a light source generating light to be detected by said photodetector.

5. Optical disk drive with a pickup and a servo controller, wherein the pickup is equipped with a photodetector and a servo actuator and wherein the servo controller generates a control signal in response to photodetector signals, said control signal being submitted to the servo actuator via a servo driver, the optical disk drive comprising:
   a power save controller for sequentially turning off the servo driver by disabling driving signals from the servo driver by disabling a supply of power to the servo driver with a controller included in the servo driver followed by turning off the photodetector, and for turning on the photodetector and the servo driver in the reverse order.

6. Optical disk drive according to claim 5, wherein disabling the driving signals from the servo driver is performed through a gate signal to the servo driver.

7. Optical disk drive according to claim 5, wherein the turning off/on of the photodetector is performed by turning off/on the power supply of the photodetector.

8. Optical disk drive according to claim 5, wherein the turning off/on of the photodetector is performed by turning off/on a light source generating light to be detected by said photodetector.

* * * * *